(12) United States Patent
Pfeil et al.

(10) Patent No.: US 7,568,541 B2
(45) Date of Patent: Aug. 4, 2009

(54) SELF-CENTERING RETURN MECHANISM

(75) Inventors: Michael C. Pfeil, South Charleston, OH (US); Gary C. Fulks, Spring Valley, OH (US); Timothy A. Haerr, Enon, OH (US); Scott J. Saiki, Dousman, WI (US); Andrew H. Roth, West Bend, WI (US)

(73) Assignees: Delphi Technologies, Inc., Troy, MI (US); Harley-Davidson Motor Company Group, Inc.

( * ) Notice: Subject to any disclaimer, the term of this patent is extended or adjusted under 35 U.S.C. 154(b) by 531 days.

(21) Appl. No.: 11/432,976

(22) Filed: May 12, 2006

(65) Prior Publication Data

US 2006/0255550 A1 Nov. 16, 2006

Related U.S. Application Data

(60) Provisional application No. 60/722,821, filed on Sep. 30, 2005, provisional application No. 60/722,686, filed on Sep. 30, 2005, provisional application No. 60/680,588, filed on May 13, 2005.

(51) Int. Cl.
*B62D 61/06* (2006.01)
*B60G 21/00* (2006.01)

(52) U.S. Cl. .................. 180/210; 180/41; 280/5.509; 280/6.155; 280/6.15; 280/124.103

(58) Field of Classification Search ............... 180/210, 180/41; 280/5.509, 5.51, 124.103, 124.111, 280/124.112, 124.113, 6.155, 6.154, 6.16
See application file for complete search history.

(56) References Cited

U.S. PATENT DOCUMENTS

| 3,637,035 | A | | 1/1972 | Washburn .................. 180/5 R |
| 4,072,325 | A | * | 2/1978 | Bright et al. ............. 280/5.521 |
| 4,351,410 | A | * | 9/1982 | Townsend .................. 180/210 |
| 4,429,900 | A | | 2/1984 | Feher ........................ 280/689 |

(Continued)

FOREIGN PATENT DOCUMENTS

EP 0 932 521 B1 8/2001

(Continued)

*Primary Examiner*—Ruth Ilan
(74) *Attorney, Agent, or Firm*—Thomas N. Twomey

(57) ABSTRACT

An auxiliary lean control system is provided for controlling a lean angle of at least a portion of a vehicle. The auxiliary lean control system includes an energy storage device for storing energy to actuate the lean control system, a stabilizing mechanism coupled to the energy storage device and to the at least a portion of the vehicle for applying energy received from the energy storage device to the at least a portion of the vehicle to adjust the lean angle of the at least a portion of a vehicle, and a linkage coupled to the energy storage device and to the stabilizing mechanism for transferring energy from the energy storage device to the stabilizing mechanism. The auxiliary lean control system controls the lean angle of the portion of the vehicle in an absence of control of the lean angle by a primary lean control system. In another aspect, the present invention provides a vehicle including a vehicle suspension apparatus and a vehicle lean control system coupled to the vehicle suspension apparatus for controlling a lean of at least a portion of the vehicle, the suspension apparatus being operable independent of the vehicle lean control system.

7 Claims, 11 Drawing Sheets

U.S. PATENT DOCUMENTS

| | | | |
|---|---|---|---|
| 4,489,954 A | 12/1984 | Yasui et al. | 280/21 R |
| 4,509,766 A | 4/1985 | Yasui et al. | 280/21 R |
| 4,546,997 A * | 10/1985 | Smyers | 280/5.509 |
| 4,624,469 A * | 11/1986 | Bourne, Jr. | 280/62 |
| 4,895,383 A | 1/1990 | Abe et al. | 280/91 |
| 5,116,069 A * | 5/1992 | Miller | 280/5.509 |
| 5,458,359 A | 10/1995 | Brandt | 280/673 |
| 5,971,404 A | 10/1999 | Stoves | 280/6.154 |
| 6,250,649 B1 * | 6/2001 | Braun | 280/5.506 |
| 6,367,824 B1 * | 4/2002 | Hayashi | 280/62 |
| 6,564,129 B2 | 5/2003 | Badenoch | 701/37 |
| 6,805,362 B1 | 10/2004 | Melcher | 280/5.52 |
| 7,343,997 B1 * | 3/2008 | Matthies | 180/215 |
| 2005/0184477 A1 | 8/2005 | Platner | 280/5.515 |

FOREIGN PATENT DOCUMENTS

| | | |
|---|---|---|
| EP | 1 568 522 A1 | 2/2005 |
| JP | 02060814 A | 3/1990 |
| WO | WO 99/61303 | 12/1999 |
| WO | WO2005/051712 | 6/2005 |

* cited by examiner

SELF-CENTERING RETURN MECHANISM

CROSS REFERENCE TO RELATED APPLICATIONS

This application claims the benefit of provisional application Ser. Nos. 60/680,588 filed on May 13, 2005, and 60/722,686 and 60/722,821 filed on Sep. 30, 2005.

BACKGROUND

The present invention relates to vehicles with lean control systems. In particular, the present invention relates to vehicles with primary and auxiliary lean control systems coupled to a vehicle leaning suspension system for enhancing vehicle stability.

Certain types of vehicles are unstable (e.g., more prone to rolling over) in certain modes of operation. For example, a three-wheeled vehicle that permits roll axis articulation may be unstable when the vehicle center of gravity is located above the roll axis. Under normal operation, many such instabilities are compensated for by using a closed loop control system (for example, an electro-hydraulic or electro-mechanical system) including or coupled to elements of the vehicle systems (for example, elements of the vehicle suspension system) which are actuatable in response to a signal from a control unit. Based on feedback to the control unit from vehicle system elements and sensors, signals from the control unit actuate the responsive vehicle system elements to stabilize the configuration of the vehicle. For example, vehicle lean control systems may cause the body of the vehicle to lean into a turn, thereby increasing the stability of the vehicle during turning.

In hydraulically-actuated lean control systems, the lean control system may fail to function properly in the event of loss of hydraulic control (due to normal system shutdown, vehicle or hydraulic system power loss, hydraulic fluid leakage, etc.) In this instance, it is desirable that the vehicle is returned to and maintains an upright (no lean) configuration until hydraulic control can be restored. It is also desirable that the configuration of the vehicle, in the absence of hydraulic control, be as stable as possible.

SUMMARY

In accordance with the present invention, an auxiliary lean control system is provided for controlling a lean angle of at least a portion of a vehicle. The lean control system includes an energy storage device for storing energy to actuate the lean control system, a stabilizing mechanism coupled to the energy storage device and to the portion of the vehicle for applying energy received from the energy storage device to the portion of the vehicle to adjust the lean angle of the portion of a vehicle, and a linkage coupled to the energy storage device and to the stabilizing mechanism for transferring energy from the energy storage device to the stabilizing mechanism. The auxiliary lean control system controls the lean angle of the portion of the vehicle in an absence of control of the lean angle by a primary lean control system.

In another aspect, the present invention provides a vehicle including a vehicle suspension apparatus and a vehicle lean control system coupled to the vehicle suspension apparatus for controlling a lean of at least a portion of the vehicle, the suspension apparatus being operable independent of the vehicle lean control system.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and coupled and variations thereof are used broadly and encompass both direct and indirect mountings, connections, supports, and couplings. Further, "connected" and "coupled" are not restricted to physical or mechanical connections or couplings. Also as used herein, the "lean angle" of the vehicle is defined as the angle at which a tiltable or leanable portion of the vehicle leans with respect to a road or other surface on which the vehicle rests.

Figure 1:
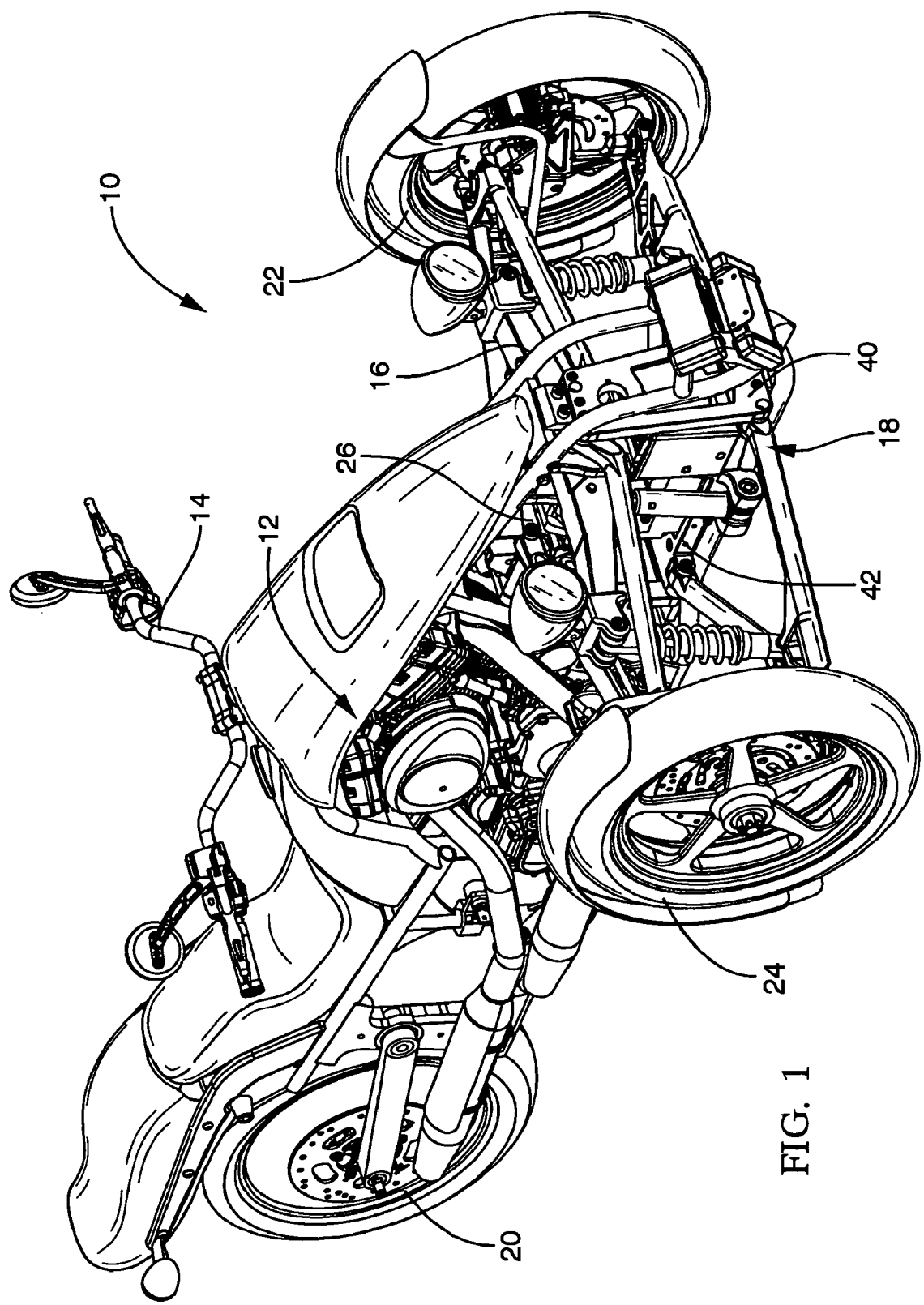
FIG. 1 is a perspective view of a three-wheeled motorcycle including a leaning front suspension coupled to an auxiliary lean control system embodying the present invention.
Figure 2:
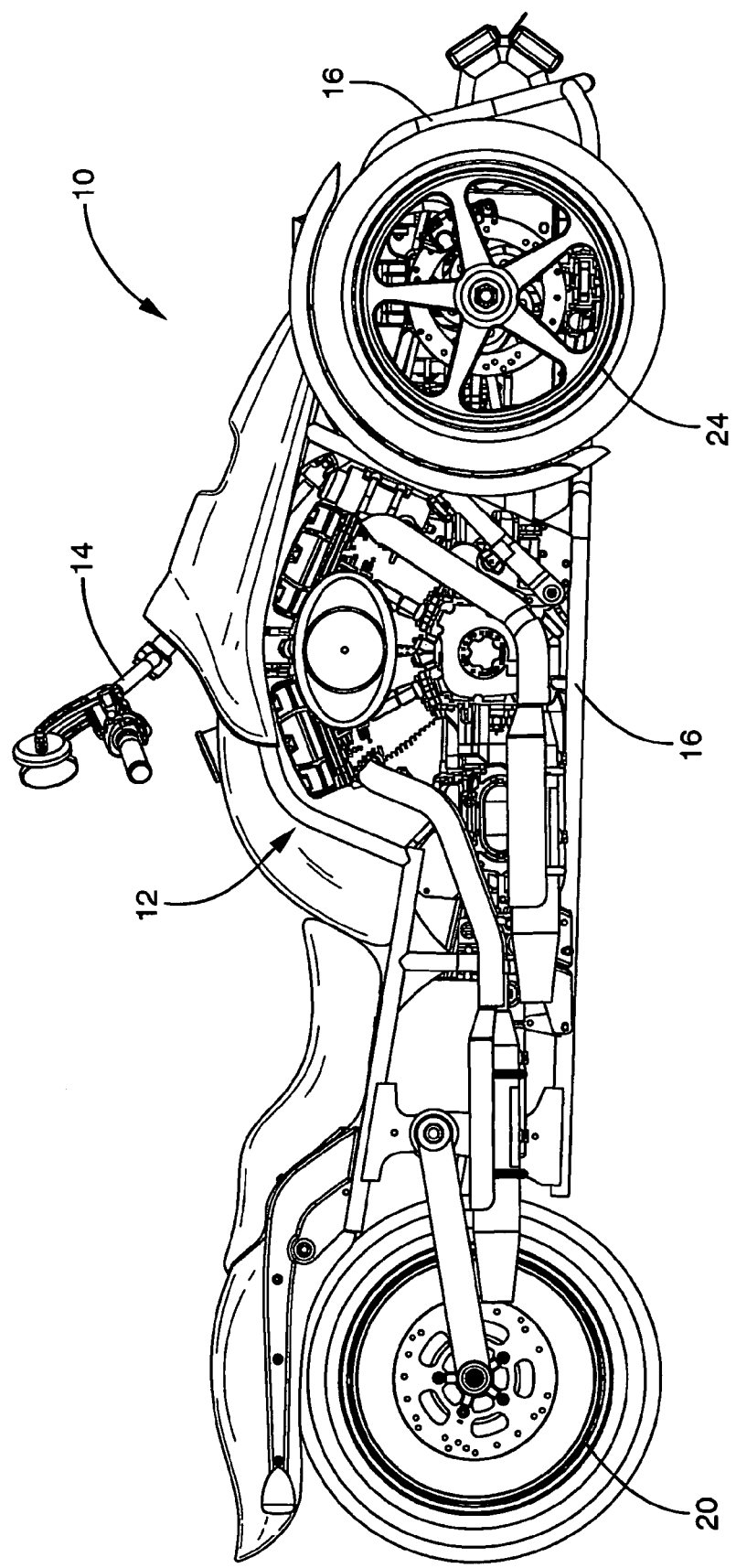
FIG. 2 is a side view of the three-wheeled motorcycle of FIG. 1.

FIGS. 1 and 2 illustrate a three-wheeled motorcycle or trike 10 having an engine 12, handlebars 14, a frame 16, a single rear wheel 20, first and second front wheels 22, 24, and an auxiliary lean control system 26. The rear wheel 20 is rotatably mounted to a rear portion of the frame 16, and the front wheels 22, 24 are coupled to the frame 16 via a leaning suspension system 18. The frame 16 includes a front bulkhead 40 and a main bulkhead 42 defining the front portion of the frame 16. The front bulkhead 40 is connected to the main bulkhead 42 to stiffen and strengthen the entire suspension system 18. The engine 12 is coupled to the rear wheel 20 through a drive assembly (not shown) to propel the trike 10. The handlebars 14 are pivotally coupled to the front portion of the frame 16 and coupled to the front wheels 22, 24 through a steering system to controllably turn the front wheels 22, 24.

The illustrated embodiment is for a trike 10 having two steerable front wheels 22, 24 and a single, driven rear wheel 20. It should be noted that it is within the scope of the invention to employ the suspension system and lean control systems of the present invention in a vehicle having two rear wheels and a single front wheel. Also, in other embodiments, the suspension system and lean control systems can be used for the front wheels, the rear wheels, or both the front and rear wheels in a vehicle having four wheels, such as an ATV.

Figure 3:
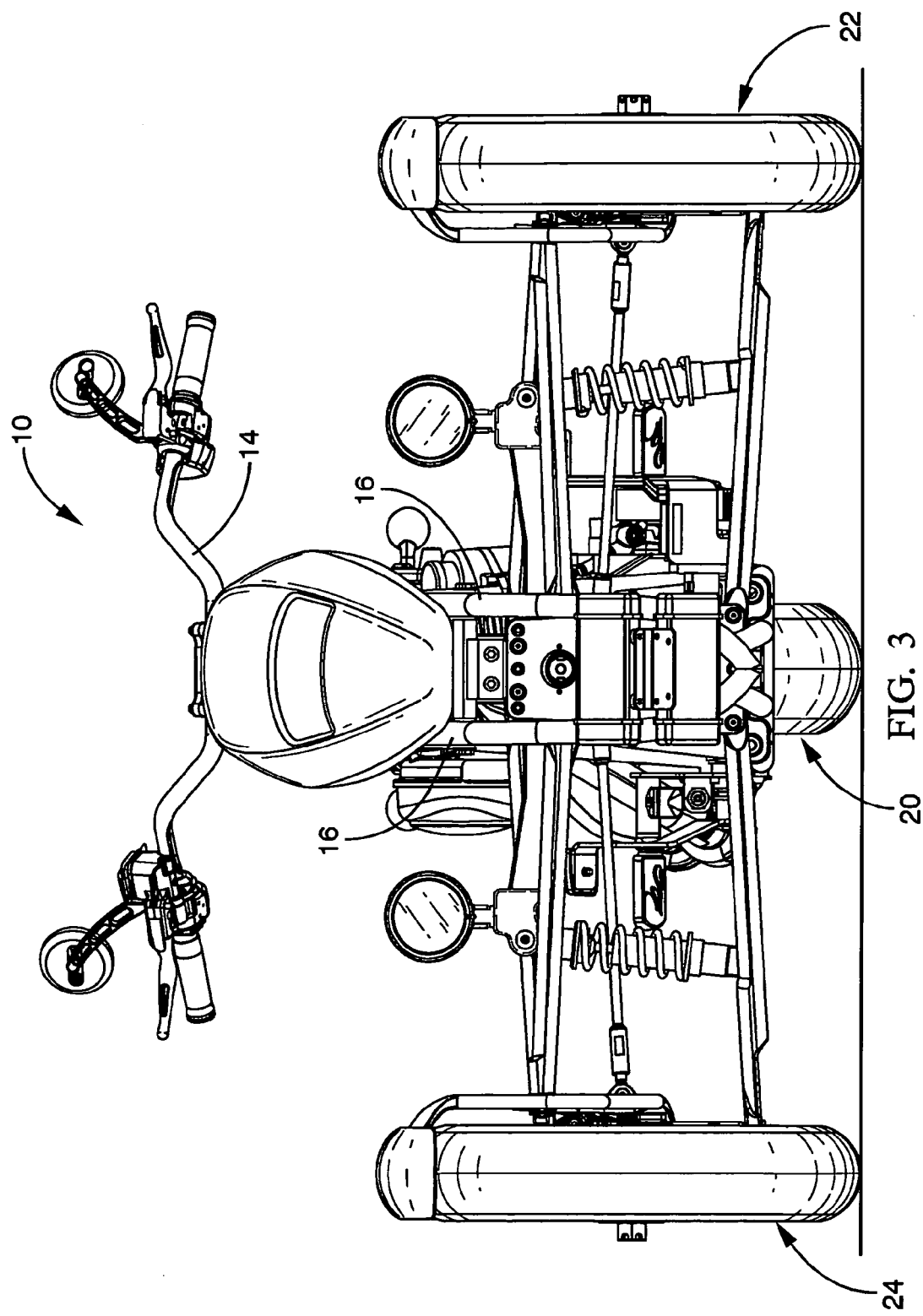
FIG. 3 is a front view of the three-wheeled motorcycle of FIG. 1, illustrating the three-wheeled motorcycle in an upright position.
Figure 4:
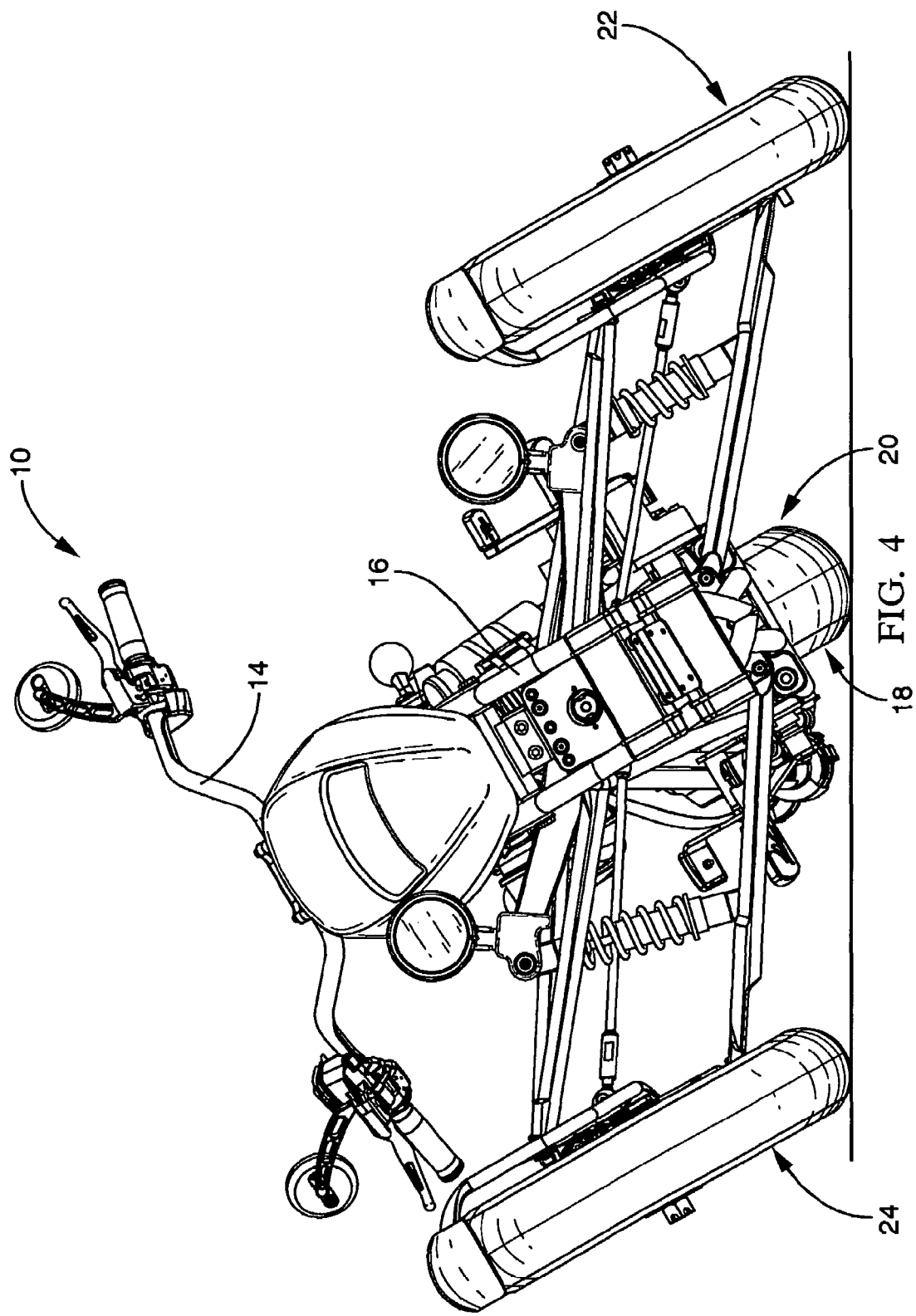
FIG. 4 is a front view of the three-wheeled motorcycle of FIG. 1, illustrating the three-wheeled motorcycle in a leaning position.

FIG. 3 illustrates a front view of the trike 10 of FIG. 1, showing the leaning suspension system 18 in an upright position. This position illustrates the orientation of the suspension system 18 while the trike 10 tracks a straight line on a flat surface. FIG. 4 illustrates the front view of the trike 10 in a leaning configuration. This view shows how the suspension system 18 is oriented when the trike 10 is turning, or tracking an arcuate path. It should be noted that in order to highlight the different positions of the suspension system 18 between FIGS. 3 and 4, the handlebar 14 and wheel 22, 24 positions are illustrated in the same center straightforward position for both FIGS. 3 and 4. Although this position is correctly illustrated in FIG. 3 the handlebar 14 position and the wheel 22, 24 positions in FIG. 4 should he pivoted and turned, respectively, toward or into the direction of the turn.

As used herein, the term "leaning suspension system" is defined as a suspension system that permits and/or facilitates leaning of a portion of the vehicle, wherein the leaning is initiated in response to forces exerted on the vehicle during turning of the vehicle by an active or passive lean control system installed in the vehicle.

Figure 5:
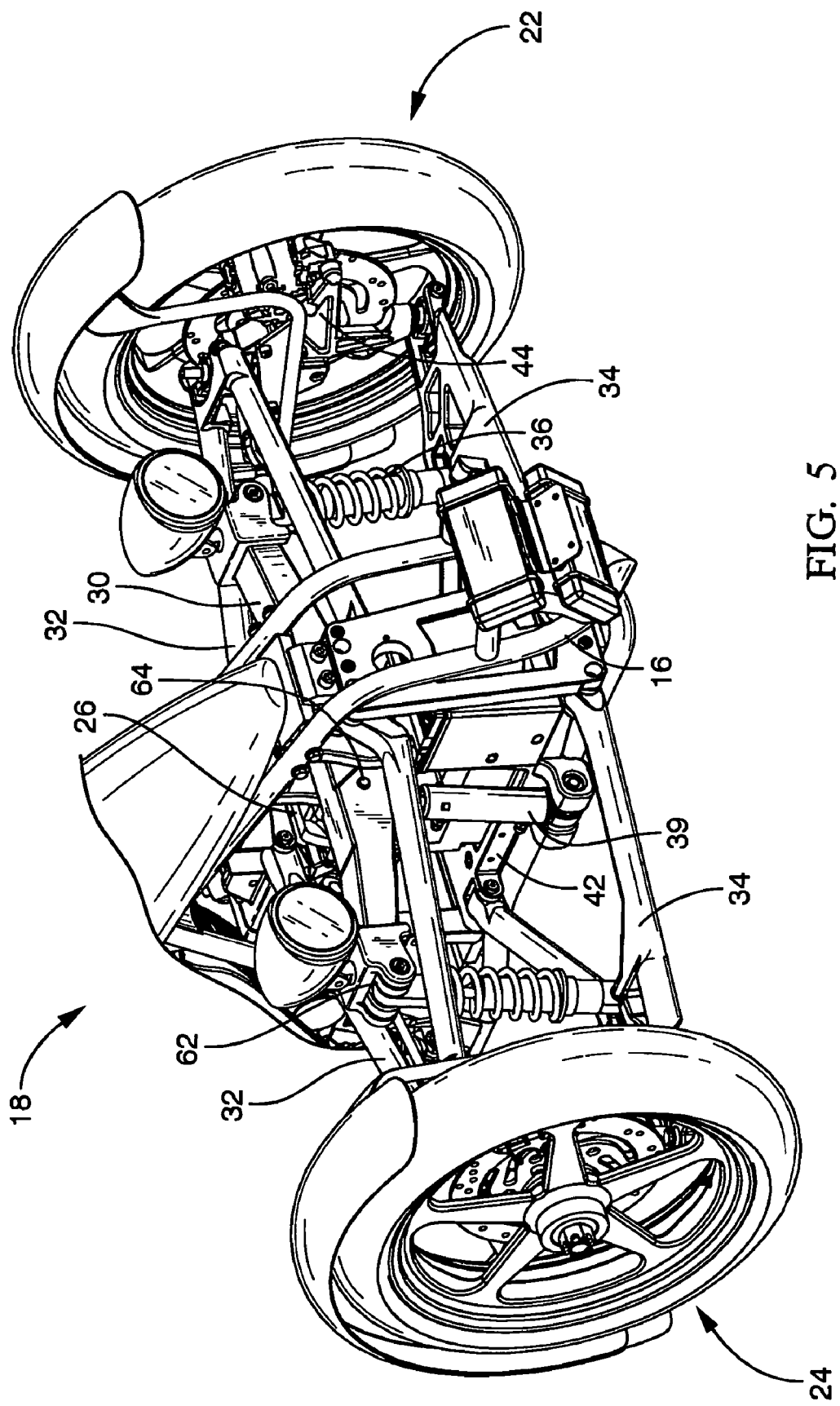
FIG. 5 is an enlarged perspective view of the front suspension of the three-wheeled motorcycle of FIG. 1.
Figure 6:
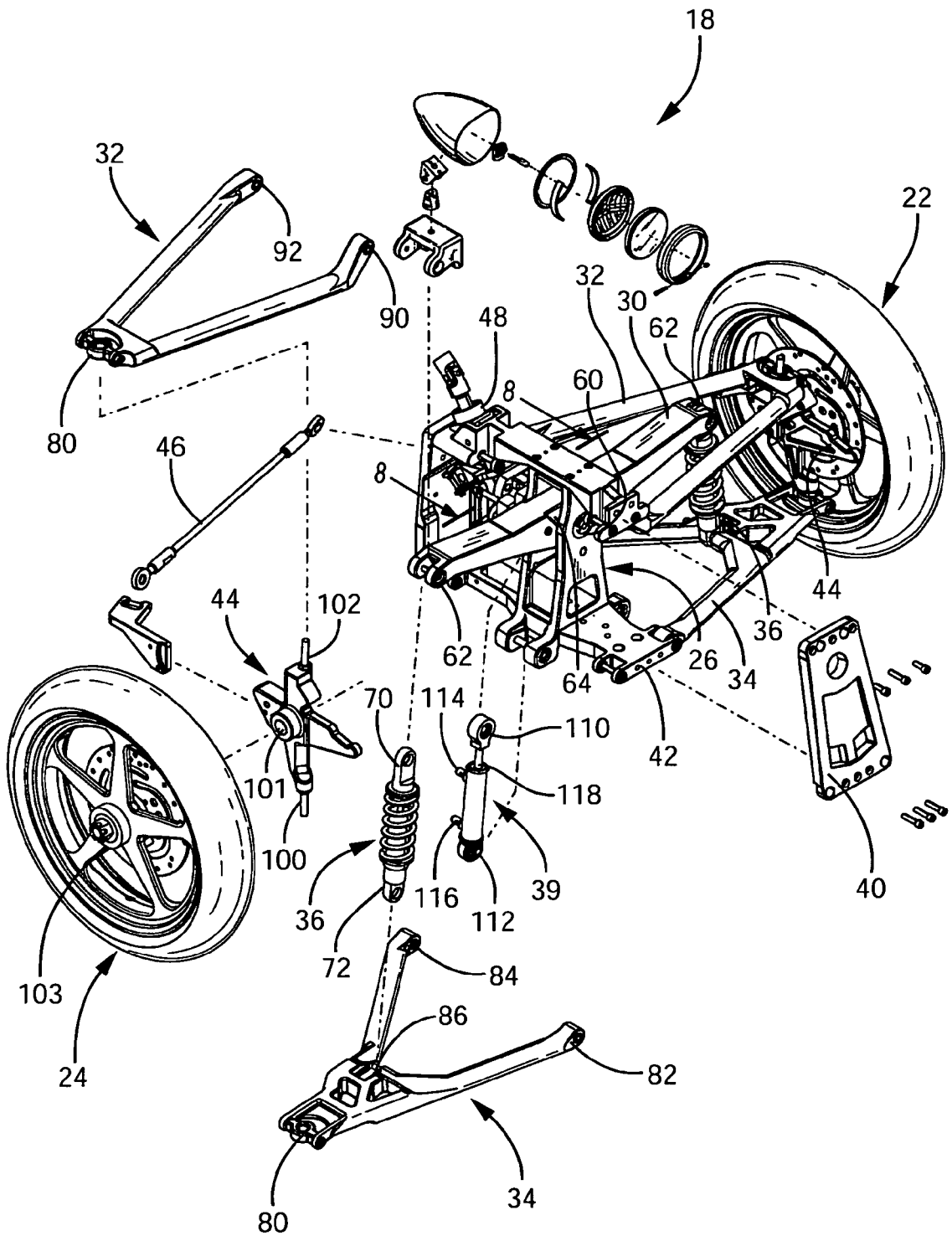
FIG. 6 is an exploded perspective view of the front suspension of the three-wheeled motorcycle shown in FIG. 5.

FIGS. 5 and 6 illustrate a perspective view and an exploded perspective view of the leaning suspension system 18, respectively. The leaning suspension system 18 includes a transverse beam 30, upper control arms 32, lower control arms 34, spring dampers 36, and spindles 44. The spindles 44 each include upper and lower pins 102, 100, as well as means for rotatably coupling to one of the front wheels 22, 24, such as a hole 101 for receiving a wheel axle 103. The structure of the spindle 44 is well known to those skilled in the art.

Figure 9:
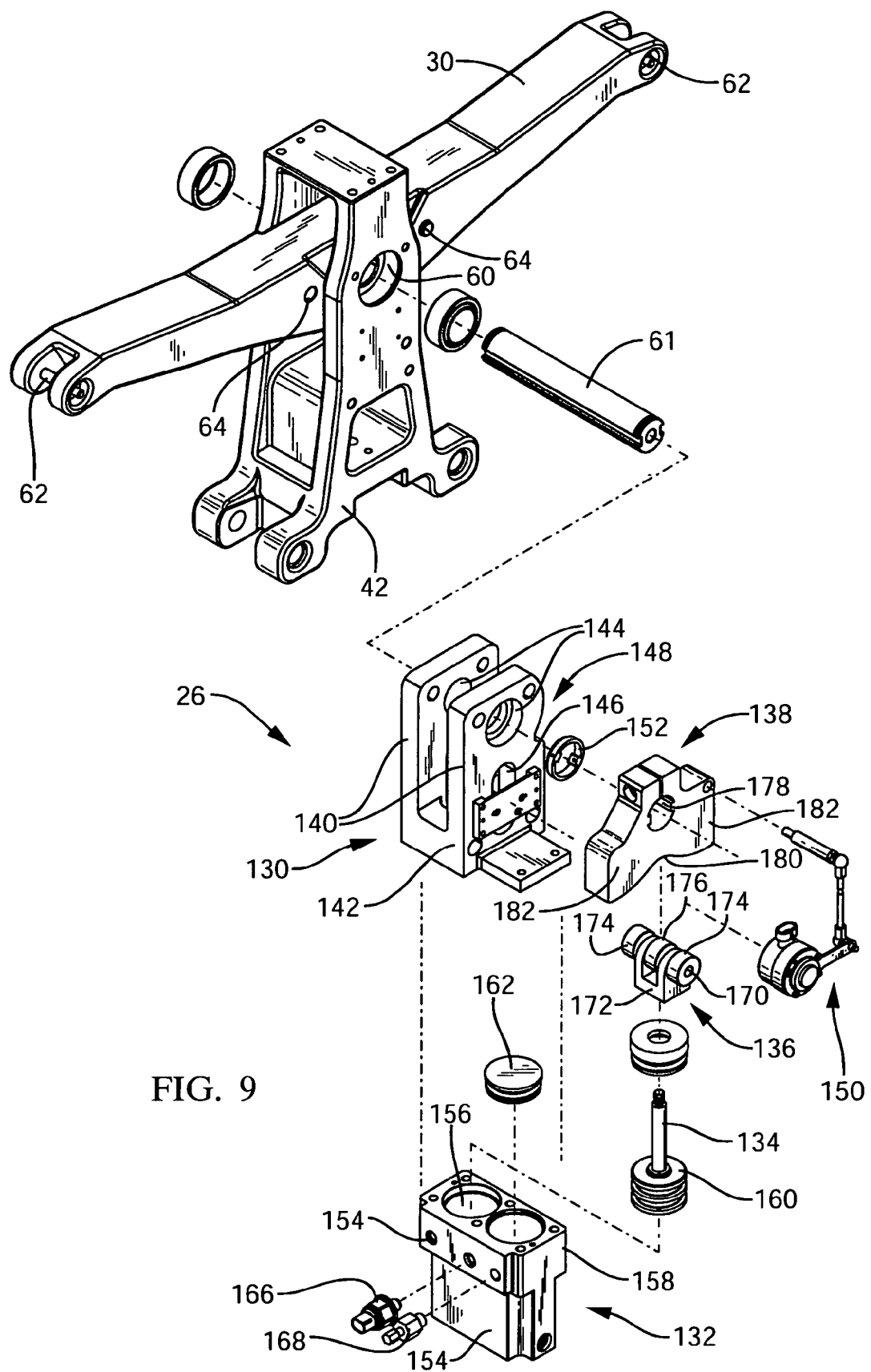
FIG. 9 is an exploded perspective view of one embodiment of the auxiliary lean control system for the three-wheeled motorcycle of FIG. 1.

The transverse beam 30 is rigid and remains substantially horizontal during operation of the trike 10. The transverse beam 30 has a center pivot point 60, end pivot points 62, and intermediate pivot points 64. In the embodiment shown in FIGS. 5 and 6, transverse beam 30 is pivotally coupled to a portion of the main bulkhead 42 at the center pivot 60 using a keyed shaft 61 (FIG. 9). However, other methods of coupling beam 30 to main bulkhead 42 are also contemplated. The center pivot 60 is positioned to coincide with a longitudinal centerline of the trike 10 and defines a pivot axis that is parallel to the vehicle centerline. The end pivot points 62 are pivotally coupled to upper pivots 70 on the spring dampers 36.

The lower control arms 34 have trunnions 80 rotatably coupled to one end and adapted to rotatably receive the lower pin 100 on the spindles 44. These trunnions 80 allow the suspension to operate independent of wheel steering by permitting the spindles 44 to pivot and turn regardless of the position of the lower control arms 34. The two remaining ends of the lower control arms 34 include front and rear pivot points 82, 84 that are pivotally connected to the main bulkhead 42. Central pivot 86 is located centrally on the lower control arms 34 and is adapted to pivotally couple to lower pivot points 72 on the spring dampers 36.

The upper control arms 32 also have trunnions 80 rotatably coupled to one end adapted to rotatably receive the upper pin 102 on the spindles 44. These trunnions 80 allow the suspension to operate independent of wheel steering. The two remaining ends of the upper control arms 32 include front and rear pivot points 90, 92 that are pivotally connected to the main bulkhead 42.

In the illustrated embodiment, the transverse beam 30 is positioned between the front and rear pivots 90, 92 on the upper control arms 32. In other embodiments, the transverse beam 30 could be positioned in front of the front pivots 90, behind the rear pivots 92, or coupled to a different location than the upper control arms 32 (i.e. coupled to a different bulkhead).

As mentioned above, the spring dampers 36 include upper and lower pivot points 70, 72 connecting the transverse beam 30 to the lower control arms 34. The spring dampers 36 include a shock-absorbing member surrounded by a biasing member. This style of spring damper 36 is well known to those skilled in the art, and will not be discussed in further detail. Alternative embodiments may utilize a different method of biasing and shock absorbing, such as leaf springs, coil springs, or air springs.

A first or primary vehicle lean control system affects the attitude or orientation of vehicle bulkheads 40 and 42 with respect to the ground on which the vehicle rests. Referring again to FIG. 6, the primary lean control system includes hydraulic actuators 38, 39 having upper and lower pivot points 110, 112. The illustrated embodiment shows the upper pivot points 110 of the hydraulic actuators 38, 39 are pivotally coupled to the intermediate pivot points 64 on the transverse beam 30 at a location between the center pivot point 60 and one of the end pivot points 62. Other embodiments could include the hydraulic actuators 38, 39 pivotally coupled to the end pivot points 62 and the spring dampers 36 pivotally coupled to the transverse beam 30 at a location between the center pivot point 60 and one of the end pivot points 62. The hydraulic actuators 38, 39 and spring dampers can also be pivotally coupled to other points along the transverse beam 30.

The hydraulic actuators 38 shown in the illustrated embodiment include a cylinder having top and bottom fluid ports 114, 116. A piston (not shown in FIG. 6) exists at the end of a shaft 118 within each cylinder. When hydraulic fluid is forced into the top fluid port 114 by a hydraulic pump (not shown), the internal piston is forced down, and the shaft 118 retracts. While this is happening, hydraulic fluid is being forced out of the bottom fluid port 116 and into a reservoir (not shown in FIG. 6). When hydraulic fluid is forced into the bottom fluid port 116, the internal piston is forced up, and the shaft 118 extends. While this is happening, hydraulic fluid is being forced out of the top fluid port 114 and into the reservoir.

The steering system includes spindles 44, tie rods 46, and the steering box 48. The handlebars 14 are coupled to the steering box 48 such that when an operator turns the handlebars 14, an output shaft (not shown) on the steering box 48 rotates. The output shaft is pivotally coupled to a first end of each tie rod 46. The second end of each tie rod 46 is pivotally coupled to one of the spindles 44. As the output shaft on the steering box 48 rotates, the tie rods 46 follow, pulling one spindle 44 and pushing the other. The spindles 44 are rotatably coupled to the upper and lower control arms 32, 34 by upper and lower pins 102, 100. Thus the pushing or pulling action initiated by the tie rods 46 causes the spindles 44, and thus the front wheels 22, 24, to rotate about the upper and lower pins 102, 100.

The hydraulic actuators 38, 39 act to control the orientation of the trike 10 during normal vehicle operation. When entering a turn, one of the hydraulic actuators 38, 39 extends in length while the other retracts, moving the trike 10 into a leaning position as illustrated in FIG. 4. When the trike 10 is leaving the turn, the hydraulic actuators 38, 39 act to bring the trike 10 back to a vertical orientation as illustrated in FIG. 3.

Figure 13:
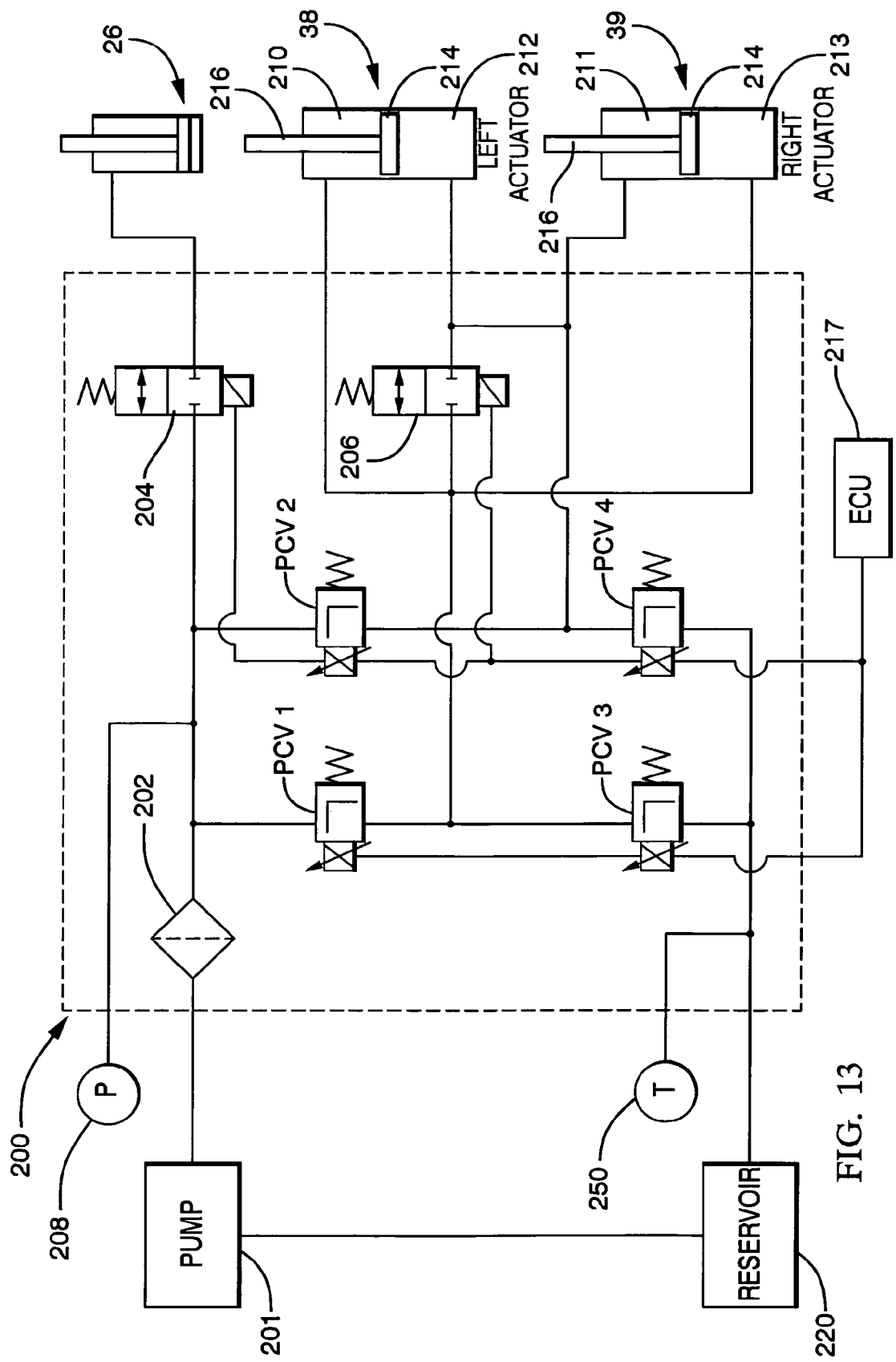
FIG. 13 is a schematic illustrating a hydraulic system for actuating the primary and auxiliary lean control systems of the three-wheeled motorcycle of FIG. 1.

The hydraulic actuators are controlled by an electronic control system or unit (ECU) (shown in FIG. 13). The configuration of the electronic control unit is known in the art. In one embodiment, the electronic control unit comprises a programmable digital computer apparatus having a processor, ROM, RAM and I/O apparatus coupled to sensor elements (not shown) and actuatable elements of the vehicle, for receiving input signals and delivering output signals. The electronic control unit stores and runs a control program while the vehicle is in use. The sensor elements supply control-related data to the ECU. The ECU receives input signals from the vehicle sensors (for example, signals indicative of vehicle road speed, the steering angle of the trike handlebars, etc.) and delivers output control signals to the actuatable elements of the vehicle responsive to the input signals. Examples of ECU outputs include a current for energizing a solenoid used to actuate one or more of valves PCV1-PCV4, or a control signal resulting in the supply of desired currents to the solenoids. A typical control unit is described in U.S. Pat. No. 6,564,129, incorporated herein by reference.

The substantially horizontal orientation of the transverse beam 30 is maintained by the influence of the spring dampers 36. The lower control arms 34 are connected to the front wheels 22, 24 through the spindles 44 and to the transverse beam 30 by the spring dampers 36. The front wheels 22, 24, and thus the lower control arms 34, remain substantially parallel to the road during normal operation. The road is generally substantially planar for the width of the trike 10, meaning that as long as both front wheels 22, 24 are in contact with the road, whether cornering or tracking a straight line, the spring dampers 36 will bias the transverse beam 30 to an orientation substantially parallel to the road. The hydraulic actuators 38, 39 connect the frame 16 to the transverse beam 30, and control the lean of the trike 10. As the hydraulic actuators 38, 39 extend, they push the frame 16 away from the transverse beam 30, initiating lean. The biasing force from the spring dampers 36 acting on the transverse beam creates a larger moment about the central pivot 86 than the hydraulic actuators 38, 39, so extension of the hydraulic actuators 38, 39 moves the frame 16 with respect to the beam 30.

Using hydraulic actuators 38, 39 as discussed affords some major advantages to trikes. First, since the lean of the trike 10 is controlled by the hydraulic actuators 38, 39, the upper and lower control arms 32, 34, spring dampers 36, and steering components are free to act normally, regardless of the trikes lean. This allows the trike 10 to absorb bumps while tracking an arcuate path in the same manner it would if it were tracking a straight line, making for a consistent suspension action, even while turning.

As stated previously, upon failure, deactivation, or malfunctioning of the primary lean control system, it is desirable that the vehicle is returned to and maintains an upright (no lean) configuration until hydraulic control can be restored. It is also desirable that this upright configuration of the vehicle, in the absence of hydraulic control, be as stable as possible.

Figure 7:
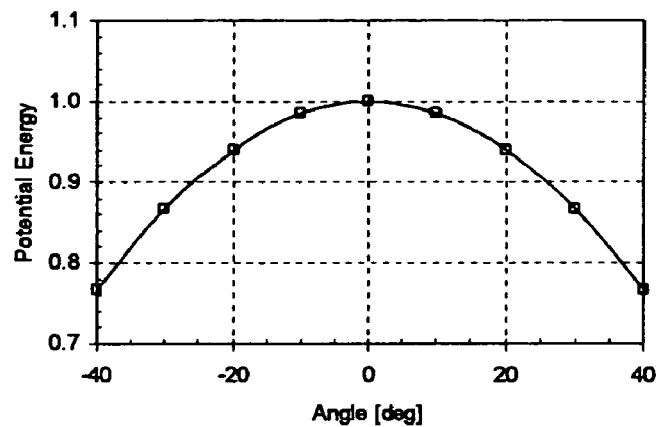
FIG. 7 is a graphical representation of a potential energy function describing the vehicle state during operation of a primary lean control system of the vehicle.

Instability in the configuration of the vehicle may be characterized as a relatively greater amount of potential energy stored within the configuration of the vehicle system. FIG. 7 is a graphical representation of a potential energy function describing the vehicle state during operation of the primary vehicle lean control system. In FIG. 7, the stability is expressed as a potential energy function of the vehicle system in a static case (i.e., when the vehicle velocity is zero), with a lower system potential energy reflecting a more stable orientation of the vehicle. In FIG. 7, the potential energy of the vehicle system is shown as a function of the lean angle of the vehicle provided by the vehicle lean control system. As seen in FIG. 7, the potential energy of the vehicle system is relatively lower at greater lean angles, due to a shift of the vehicle center of gravity to a position of lesser elevation. In contrast, a relatively less stable vehicle configuration is represented in FIG. 7 by a relative maximum potential energy of the system, which occurs when the vehicle is in the upright or on-center position. At a lean angle of zero degrees (i.e., when the vehicle is in an upright position), the vehicle center of gravity is at its highest point, and the vehicle system potential energy is relatively high.

In view of the above, upon failure, malfunction, or deactivation of the primary lean control system, it is desirable to achieve a predetermined vehicle lean angle which is closest to an upright position of the vehicle and at which the vehicle system has a relatively low potential energy. In the present invention, this is accomplished by employing an auxiliary lean control system which brings the vehicle body to a desired, predetermined lean angle upon failure, malfunction, or deactivation of the primary lean control system. In general, the energy applied by the auxiliary lean control system to adjust the lean angle to a predetermined value necessary for maximum stability will depend on the difference between the current lean angle of the vehicle and the desired predetermined lean angle of the vehicle. The auxiliary lean control system stores a quantity of energy sufficient to return a portion of the vehicle to the desired predetermined lean angle for stability.

Figure 8:
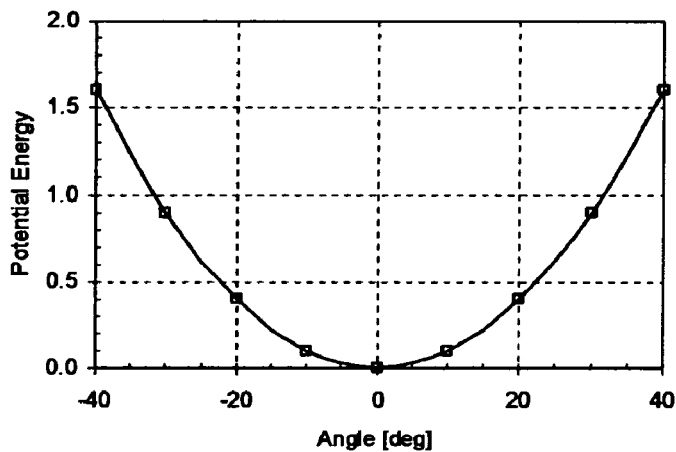
FIG. 8 is a graphical representation of a potential energy function of an auxiliary lean control system operable upon deactivation or malfunction of the primary lean control system.

In a particular embodiment illustrating the principles of the present invention, it is desirable that the vehicle system have a relatively low potential energy when the vehicle is in an upright position (i.e., when the vehicle has a lean angle of approximately zero) and resting on a substantially flat surface. FIG. 8 is a graphical representation of a potential energy function of an auxiliary lean control system in accordance with the present invention. FIG. 8 illustrates the energy input into the vehicle system by the auxiliary lean control system to adjust the lean angle of a portion of the vehicle to approximately zero, as a function of the lean angle of the portion of the vehicle when the primary lean control system becomes inactive. As seen in FIG. 8, the potential energy input by the auxiliary lean control system is greatest at the largest vehicle lean angle shown because the greater the difference between the existing vehicle lean angle and the desired predetermined lean angle for vehicle stability (in this case zero degrees), the greater the energy that must be expended by the auxiliary system in returning the vehicle to the desired predetermined lean angle.

The force required to adjust the vehicle lean angle (or other vehicle orientation parameter) can be transmitted to the suspension system via any of a variety of known alternative means (for example, using a crank mechanism). The actual structure utilized will depend on the specifics of the application and the interface of the articulation system hydraulics.

FIG. 9 is an exploded view of one embodiment of an auxiliary lean control system 26 in accordance with the present invention, coupled to transverse beam 30. Auxiliary lean control system 26 generally includes an energy storage device for storing energy to actuate the lean control system, a stabilizing mechanism coupled to the energy storage device and to the leanable portion of the vehicle for applying energy received from the energy storage device to the leanable portion of the vehicle, and a linkage coupled to the energy storage device and to the stabilizing mechanism for transferring energy from the energy storage device to the stabilizing mechanism.

In the embodiment shown in FIG. 9, the energy storage device comprises a power cylinder 132 coupled to a portion of the main bulkhead 42 below the frame 130, the linkage comprises a shaft 134, and the stabilizing mechanism comprises a roller assembly 136 and a cam 138. Referring to FIG. 9, a frame 130 is coupled to a portion of the main bulkhead 42 adjacent the transverse beam 30 and includes two parallel plates 140 extending vertically from a base 142. The plates 140 are substantially identical, but one of the plates includes a clearance cut 148 to allow full rotation of an angle sensor 150 connected to the cam 138. Both plates 140 define a central aperture 144 aligned with the center pivot point 60 of the transverse beam 30 and a guide slot 146 for the roller assembly 136. The central aperture 144 defined by each plate 140 is adapted to rotatably support the keyed shaft 61 using a bushing 152. The guide slot 146 extends vertically below the central aperture 144, and provides a limiting path of travel for the roller assembly 136.

The power cylinder 132 is coupled to a portion of the main bulkhead 42 below the frame 130, and is coupled to the base 142 of the frame 130. The power cylinder 132 includes a housing 154, first and second cylinders 156, 158, a piston 160 movable inside the first cylinder 156, and a cap 162 sealing the second cylinder 158. The cylinders 156, 158 are in fluid communication through an aperture (not shown) at the bottom of the cylinders 156, 158. The circumference of the piston 160 forms a seal with the inner wall of the first cylinder 156. The volume of the first cylinder 156 above the piston 160 is in fluid communication with a hydraulic system 200 of the trike 10, and the second cylinder 158 (and thus the volume of the first cylinder 156 below the piston 160), is filled with a compressible fluid, such as a pressurized gas. Although the energy source for the embodiment of the auxiliary lean control system described herein comprises a compressible fluid, alternative energy sources are also contemplated, for example, a hydraulic sub-system or a spring system.

The shaft 134 is coupled to the piston 160 at a first end, and coupled to the roller assembly 136 at a second end, such that linear movement of the piston 160 along an axis defined by the first cylinder 156 will cause the roller assembly 136 to move in the same fashion.

The power cylinder 132 includes a hydraulic port 164, a pressure sensor 166, and a gas fitting 168. The hydraulic port 164 allows the first cylinder 156 to be placed in fluid communication with the hydraulic system 200 of the trike 10. The pressure sensor 166 allows the pressure in the first cylinder 156 to be monitored by the electronic control system. The gas fitting 168 allows the second cylinder 158 to be filled with the pressurized gas.

The roller assembly 136 includes three individual rollers 174, 176 connected by a roller shaft 170. A roller body 172 is coupled to the second end of the shaft 134 and is adapted to rotatably support the roller shaft 170. The rollers 174 at the ends of the roller shaft 170 move within the guide slots 146 in the frame 130. The center roller 176 is adapted to move toward the cam 138 when the piston 160 moves upward in the first cylinder 156, and move away from the cam 138 when the piston 160 moves downward in the first cylinder 156.

The cam 138 includes a central aperture 178, a roller recess 180, and two protruding lobes 182. The keyed shaft 61 extends through the aperture 178 to support the cam 138 between the two parallel plates 140 of the frame 130. The roller recess 180 is positioned between the protruding cam lobes 182, and has a profile matching that of the center roller 176. The lobes 182 are angularly offset from each other, and include substantially identical inner profiles adapted to engage the center roller 176.

Figure 10:
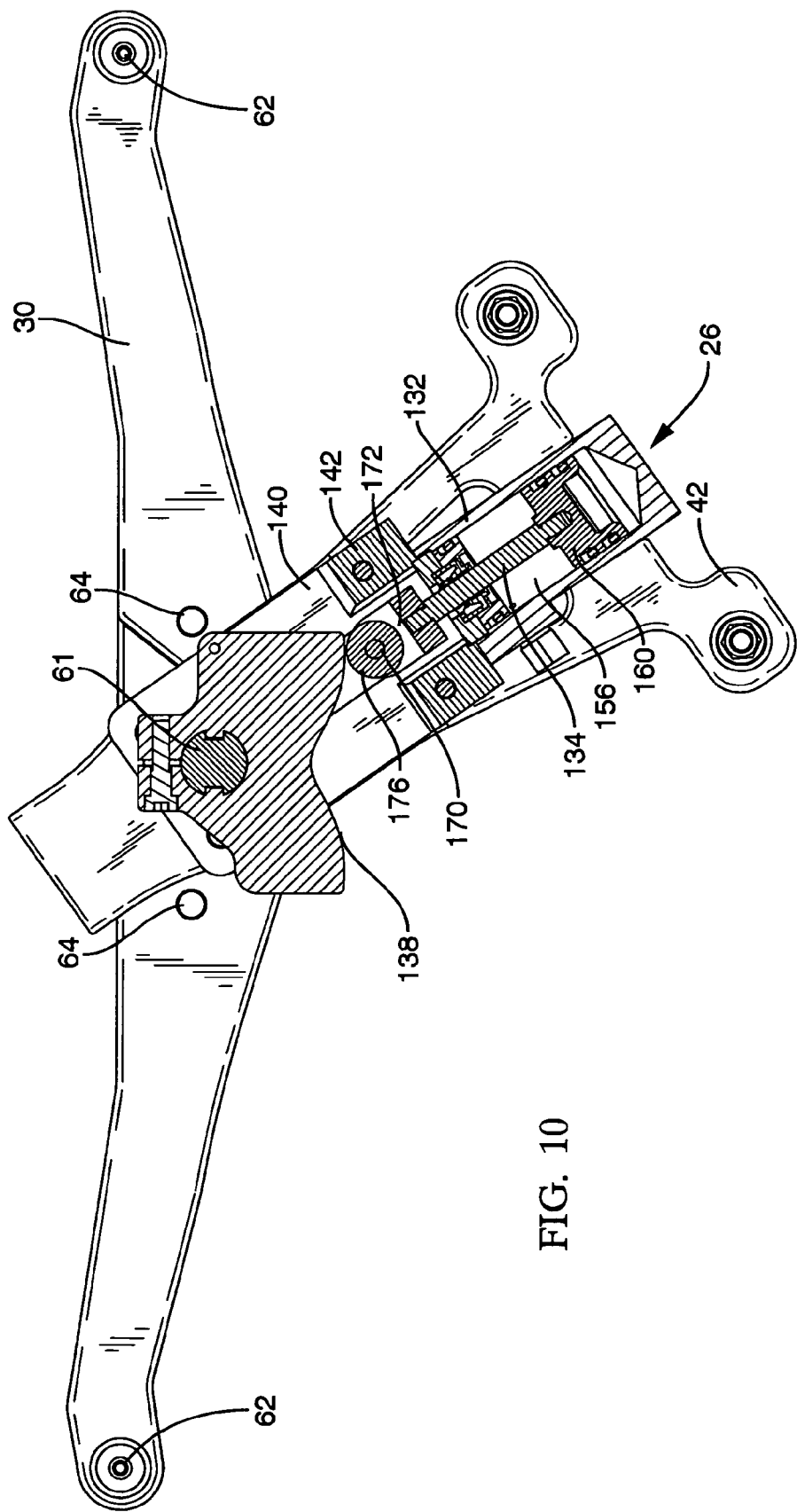
FIG. 10 is a partial cross-sectional view of the auxiliary lean control system of FIG. 9 with the three-wheeled motorcycle in a leaning position.
Figure 11:
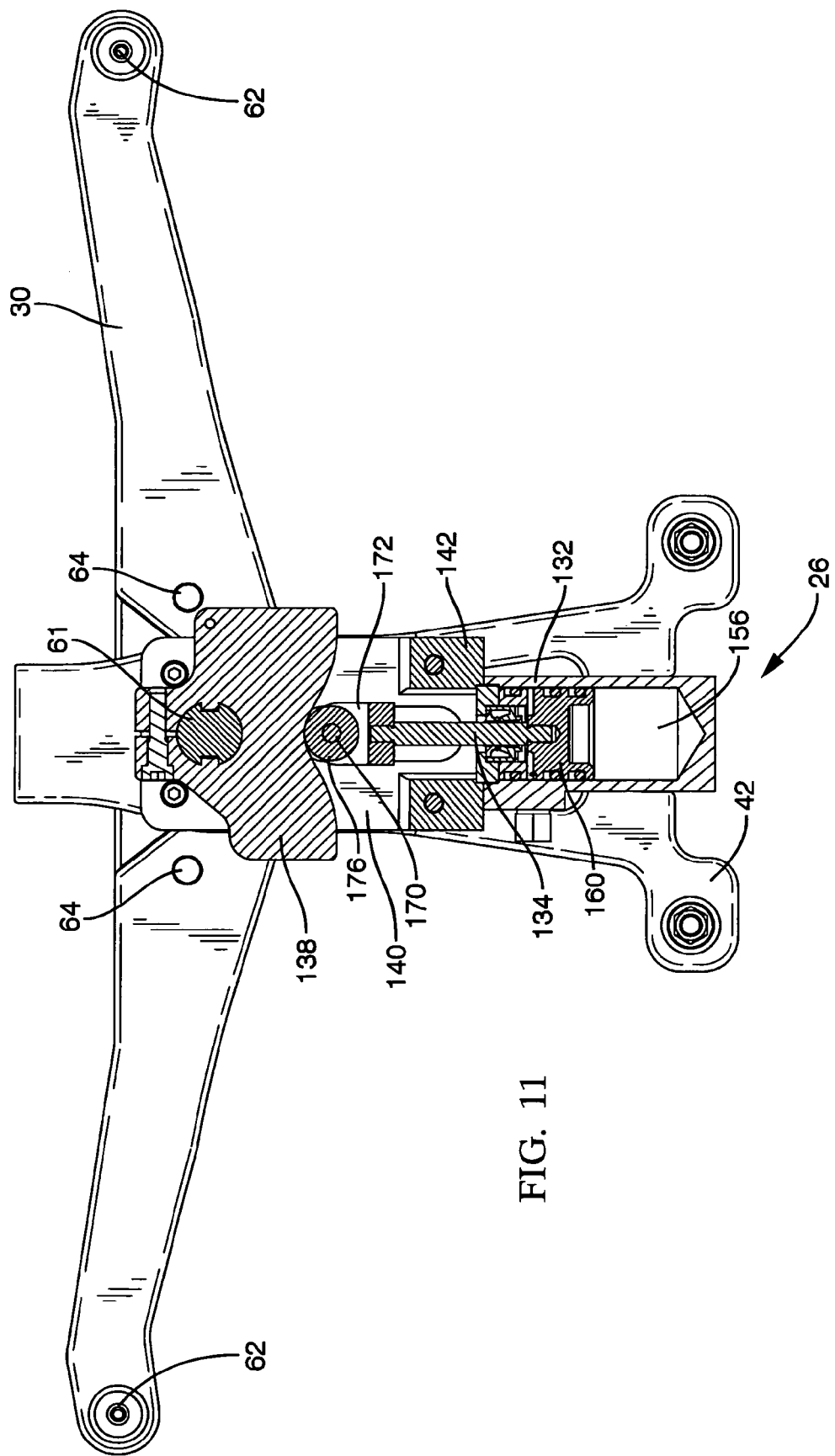
FIG. 11 is a view similar to FIG. 10, with the three-wheeled motorcycle in an upright position.

FIGS. 10 and 11 are section views of the auxiliary lean control system 26 illustrating the trike 10 in a leaning position and an upright position, respectively. Since the transverse beam 30 and the cam 138 are both supported by the keyed shaft 61, they will not rotate with respect to one another. As the trike 10 leans, the transverse beam 30 and the cam 138 remain substantially horizontal. From the perspective of the cam 138, the rest of the trike 10 appears to rotate about the keyed shaft 61. This is illustrated best in FIG. 10, where it is clear that when the trike 10 leans, the auxiliary lean control system 26 appears to rotate about the keyed shaft 61.

When the primary lean control system is functioning properly, the pressure from the hydraulic fluid in the first cylinder 156 is greater than the pressure of the compressed gas in the second cylinder 158. This forces the piston 160 downward, and disengages the roller assembly 136 from the cam 138, placing the auxiliary lean control system 26 into an unengaged position (FIG. 10). When any of the above mentioned hydraulic system failures occur, pressure is also lost to the first cylinder 156. This allows the compressed gas in the second cylinder 158 to expand and push the piston 160 up, placing the auxiliary lean control system 26 into an engaged position, where the roller assembly 136 is in contact with the cam 138 (FIG. 11). The pressure from the compressed gas is large enough that the center roller 176 pushes on the inner profile of one of the cam lobes 182 with enough force to drive the center roller 176 into the cam recess 180, bringing the trike 10 to an upright position. As long as the hydraulic system is not pressurized, the pressure in the second cylinder 158 will be greater than the pressure in the first cylinder 156. This will keep the center roller 176 engaged with the cam roller recess 180 and will prevent the trike 10 from leaning.

In the event that a failure occurs other than hydraulic system pressure loss, the electronic control unit controlling the hydraulic system 200 is capable of eliminating hydraulic fluid pumping, and thus hydraulic pressure. This also relieves the pressure in the first cylinder 156, allowing the auxiliary lean control system 26 to function. When the hydraulic system is pressurized again, the pressure in the first cylinder 156 will again be greater than the pressure in the second cylinder 158. This forces the piston 160 downward, disengaging the roller assembly 136 from the cam 138 and allowing the bike 10 to function normally.

The embodiment just described is adapted for bringing a portion of the trike to a lean angle of approximately zero degrees (corresponding to an upright position) when the trike resides on a substantially level road surface. In this case, piston 160 forces roller assembly 136 to rollingly engage the contoured surface of cam 138 until the roller assembly is centered along the contoured surface of the cam. The rollers become nested and locked within the grove formed in the cam surface when a lean angle of approximately zero degrees is achieved. Pressure applied by piston 160 holds the rollers in place, which locks the auxiliary lean control system in the zero-degree lean angle configuration and prevents the vehicle from leaning away from this position, thereby providing an upright vehicle configuration having a relatively low potential energy.

Figure 12:
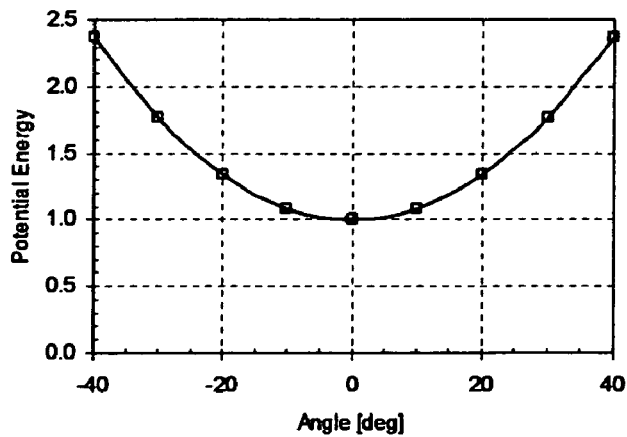
FIG. 12 shows a resultant potential energy function derived by applying the energy stored in the auxiliary lean control system shown in FIG. 9 to the vehicle system, effectively combining the potential energy function shown in FIG. 8 with the potential energy function shown in FIG. 7.

FIG. 12 shows a resultant potential energy function derived by applying the energy stored in the second lean control system to bring the vehicle body to an upright configuration in which the lean angle to approximately zero (on a substantially level road surface), effectively combining the potential energy function shown in FIG. 7 with the potential energy function shown in FIG. 8. In addition, when the vehicle body is brought to an upright position, the vehicle body is locked in the upright position by the auxiliary lean control system to prevent the vehicle body from leaning in either lateral direction while the first lean control system is non-functioning and while the second lean control system is engaged. It may be seen from FIG. 3 that the upright configuration of the vehicle with the leaning suspension system locked in a zero or near-zero lean angle configuration is a relatively stable configuration of the vehicle, since a non-zero vehicle lean angle may only be achieved by tilting or rolling the entire vehicle, thereby creating a vehicle configuration at a state of relatively higher potential energy than that provided by the upright, zero lean-angle configuration.

The shape of the auxiliary system potential function of FIG. 8 may be controlled by a combination of accumulator pressure and system mechanics (cam dimensions, etc.). The optimum shape of the function will be determined by factors such as the configuration of the vehicle upon deactivation or malfunction of the primary lean control system, and the desired final configuration of the vehicle. A potential function representing the final vehicle configuration (and combining the potential functions shown in FIGS. 7 and 8) is shown in FIG. 12. The shape of the combined function in any particular application will be determined by the desired final configuration of the vehicle.

FIG. 13 is a schematic illustrating the hydraulic system 200 of the trike. The hydraulic system 200 includes a pump 201, a filter 202, four proportional control valves PCV1-PCV4, a centering valve 204, a centering enable valve 206, a pressure sensor 208, a temperature sensor 250, and a reservoir 220. FIG. 10 also shows that the hydraulic actuators 38, 39 include top fluid chambers 210, 211 and bottom fluid chambers 212, 213, respectively. These fluid chambers are defined by a movable piston 214 rigidly connected to a shaft 216.

The pressurized hydraulic fluid supplied to the system 200 by the pump 201 passes through the filter 202 first to remove any contaminants. After passing through the filter 202, hydraulic fluid is supplied to valves PCV1, PCV2, and centering valve 204. Each of the valves PCV1-PCV4 receives instructions to either open or close from electronic control unit 217. Each of the valves may be closed or open individually to any degree, however, to simplify explanation, the valves PCV 1-PCV4 will be referred to as being either completely open or completely closed.

First, to cause the trike 10 to lean to the right, valves PCV1 and PCV4 are completely closed while PCV2 and PCV3 are completely open. This situation permits the pumping of fluid through PCV2 and into hydraulic actuator chambers 211 and 212. This will cause the left actuator 38 to extend in length while the right actuator 39 retracts. At the same time, fluid from hydraulic actuator chambers 210 and 213 is forced out of the hydraulic actuators 38, 39 by the pistons 214. The fluid exiting the chambers 210, 213 is forced through open valve PCV3 and to the reservoir 220. In the second condition, causing the trike 10 to lean to the left, valves PCV2 and PCV3 are completely closed while PCV1 and PCV4 are completely open. This situation permits the pumping of fluid through PCV1 and into hydraulic actuator chambers 210 and 213. This will cause the right actuator 39 to extend in length while the left actuator 38 retracts. At the same time, fluid from hydraulic actuator chambers 211 and 212 is forced out of the hydraulic actuators 38, 39 by the pistons 214. The fluid exiting the chambers 211, 212 is forced through open valve PCV4 and to the reservoir 220.

Referring to the auxiliary lean control system 26, it is mechanically controlled, and is only operable when the trike 10 needs assistance maintaining an upright position (i.e., when the hydraulic system 200 is no longer able to supply enough pressure to properly utilize the hydraulic actuators 38, 39). Loss of hydraulic system pressure can occur in a number of different ways. When the trike 10 is parked and turned off, the hydraulic pump 201 is no longer applying pressure to the hydraulic system 200, so the hydraulic actuators 38, 39 will not be capable of supporting the trike 10. If the hydraulic system 200 fails in any way (i.e. pump failure, ruptured hose, punctured hydraulic actuator, etc.), pressure will also be lost, even if the engine 12 is still running and the trike 10 is still operable. Yet another potential failure could occur if the electronic control system for the hydraulic actuators 38, 39 malfunctions. It should be noted that this list of failure modes is not complete and can include other programmed faults, even unrelated to the hydraulic system. Regardless of how hydraulic pressure is lost, the auxiliary lean control system 26 will return the trike 10 to an upright and safe position.

As explained above, hydraulic fluid is supplied to the centering valve 204. When the hydraulic system 200 is functioning properly, the centering valve 204 is open, allowing fluid to be pumped into the first cylinder 156 of the auxiliary lean control system 26. The pressure from the hydraulic fluid in the first cylinder 156 is greater than the pressure of the compressed gas in the second cylinder 158. This forces the piston 160 downward, and disengages the roller assembly 136 from the cam 138, placing the auxiliary lean control system 26 into an unengaged position. When the pressure in the first cylinder 156 reaches a predetermined level measured by the pressure sensor 166, the ECU 217 instructs the centering valve 204 to close. While the centering valve 204 is closed, pressure is maintained in the first cylinder 156. This ensures that the auxiliary lean control system 26 will remain in the unengaged position, even if hydraulic system pressure fluctuates. However, if hydraulic system pressure falls to a predetermined level, the ECU 217 will instruct the centering valve 204 to open. This will bring the first cylinder 156 back into fluid communication with the hydraulic system 200, and consequently allow the fluid contained in the first cylinder 156 to be forced back into the de-pressurized hydraulic system 200 due to the pressure from the compressed gas in the second cylinder. At the same time, the auxiliary lean control system 26 will to move to an engaged position, where the roller assembly 136 is engaged with the cam. The pressure from the compressed gas is large enough that the center roller 176 pushes on the inner profile of one of the cam lobes 182 with enough force to drive the center roller 176 into the cam recess 180, bringing the trike 10 to an upright position. As long as the hydraulic system 200 is not re-pressurized, the pressure in the second cylinder 158 will be greater than the pressure in the first cylinder 156. This will keep the roller assembly 136 engaged with the cam roller recess 180 and will prevent the trike 10 from leaning.

If a failure occurs other than hydraulic system pressure loss, the ECU 217 is capable of eliminating hydraulic fluid pumping, and thus hydraulic pressure. This also relieves the pressure in the first cylinder 156, allowing the auxiliary lean control system 26 to function. When the hydraulic system 200 is pressurized again, the pressure in the first cylinder 156 will again be greater than the pressure in the second cylinder 158. This forces the piston 160 downward, disengaging the roller assembly 136 from the cam 138 and allowing the trike 10 to function normally.

Referring to FIG. 13, a hydraulic system failure may occur in which hydraulic fluid is trapped between either hydraulic actuator chambers 210 and 213, or between chambers 211 and 212. This could occur if, for example, the ECU 217 malfunctions and doesn't allow valves PCV3 or PCV4 to open. If this occurs, the hydraulic actuators 38, 39 may become locked in whatever their current state is, thereby possibly locking the trike in a leaning position. This would prevent the auxiliary lean control system 26 from operating, as the auxiliary lean control system would be incapable of exerting enough force to overcome the force exerted on the transverse beam 30 by the trapped hydraulic fluid. To remedy this situation, the centering enable valve 206 is opened when the centering valve 204 is opened. This allows hydraulic fluid to flow between any of the hydraulic actuator chambers 210-213 and prevents any hydraulic fluid from getting trapped between the hydraulic actuators 38, 39.

Unless otherwise noted, elements of the vehicle lean control systems described herein may be fabricated and interconnected using methods known in the art. It will also be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A lean control system for controlling a lean angle of at least a portion of a vehicle, the lean control system comprising:
    an energy storage device for storing energy to actuate the lean control system;
    a stabilizing mechanism coupled to the energy storage device and to the at least a portion of the vehicle for applying energy received from the energy storage device to the at least a portion of the vehicle to adjust the lean angle of the at least a portion of a vehicle; and
    a linkage coupled to the energy storage device and to the stabilizing mechanism for transferring energy from the energy storage device to the stabilizing mechanism; wherein the linkage comprises a shaft translatably coupled to the at least a portion of the vehicle so as to provide rotation of the shaft in correspondence with rotation of the at least a portion of the vehicle, the shaft having a first portion coupled to the energy storage device and a second portion coupled to the stabilizing mechanism, and wherein the stabilizing mechanism comprises a cam secured to the vehicle so as to substantially prevent rotation of the cam with respect to the vehicle and a roller rotatably coupled to the second portion of the shaft for rollingly engaging a surface of the cam during translation of the shaft, whereby rolling engagement between the roller and the surface of the cam produces rotation of the shaft, thereby producing a corresponding rotation of the at least a portion of the vehicle.

2. The lean control system of claim 1 wherein the energy storage device comprises:
    a housing;
    a hollow cylinder formed within the housing;
    a piston slidably positioned within the cylinder and adapted to form a substantially fluid-tight seal between a first portion of the cylinder proximate a first end of the piston and a second portion of the cylinder proximate a second end of the piston; and
    a compressible fluid positioned within the first portion of the cylinder between the first end of the piston and a first end of the cylinder.

3. The lean control system of claim 2 wherein the linkage is coupled to the piston such that a sliding movement of the piston along the cylinder provides a corresponding movement of the linkage to transfer energy to the stabilizing mechanism, thereby activating the stabilizing mechanism to adjust the lean angle of the at least a portion of a vehicle.

4. The lean control system of claim 3 in combination with another vehicle lean control system wherein the other vehicle lean control system is a primary lean control system controlling the lean angle of the at least a portion of the vehicle, and the lean control system is an auxiliary lean control system coupled to the at least a portion of the vehicle for controlling a lean angle of the at least a portion of the vehicle when operation of the primary lean control system is interrupted.

5. The combination of claim 4 wherein the primary lean control system is coupled to the cylinder so as to enable fluid communication with the second portion of the cylinder between the second end of the piston and a second end of the shaft whereby, when the primary lean control system is active, a fluid pressure is applied by the primary lean control system to the second end of the piston to compress the compressible fluid positioned within the first portion of the cylinder, and when operation of the primary lean control system is interrupted, the fluid pressure on the second end of the piston is reduced, permitting the compressible fluid in the first portion of the piston to expand thereby moving the piston along the cylinder to activate the stabilizing mechanism.

6. The combination of claim 4 wherein the auxiliary lean control system engages automatically upon inactivation or malfunction of the primary lean control system.

7. The lean control system of claim 1 wherein the lean control system adjusts the lean angle of the at least a portion of the vehicle from a first lean angle to a second lean angle, and wherein the lean control system substantially prevents further adjustment of the lean angle when the at least a portion of the vehicle resides at the second lean angle.

* * * * *